(12) United States Patent
Fisson et al.

(10) Patent No.: US 7,717,612 B2
(45) Date of Patent: May 18, 2010

(54) DEVICE FOR CONTINUOUSLY MIXING A FOOD DOUGH PROVIDED WITH TWO TYPES OF SUPERIMPOSED MIXING TOOLS AND A SIDE DISCHARGE

(75) Inventors: Gérard Fisson, Saint Hilaire de Loulay (FR); Laurent Jaunet, Saint Philbert de Grand Lieu (FR); Ricard Pascal, Treize Septiers (FR)

(73) Assignee: VMI (FR)

( * ) Notice: Subject to any disclaimer, the term of this patent is extended or adjusted under 35 U.S.C. 154(b) by 0 days.

(21) Appl. No.: 11/868,372

(22) Filed: Oct. 5, 2007

(65) Prior Publication Data

US 2008/0305232 A1 Dec. 11, 2008

Related U.S. Application Data

(63) Continuation of application No. PCT/FR2006/000739, filed on Apr. 4, 2006.

(30) Foreign Application Priority Data

Apr. 5, 2005 (FR) .................................. 05 03360

(51) Int. Cl.
*A21C 1/14* (2006.01)
*B01F 7/18* (2006.01)
(52) U.S. Cl. ...................................... 366/194; 366/293
(58) Field of Classification Search ................. 366/290, 366/292, 293, 295, 325.6, 294, 296, 196, 366/195, 194
See application file for complete search history.

(56) References Cited

U.S. PATENT DOCUMENTS

| | | | | |
|---|---|---|---|---|
| 422,260 | A | * | 2/1890 | Stephens ..................... 366/295 |
| 2,887,305 | A | * | 5/1959 | Van Ginneken .......... 366/159.1 |
| 2,945,634 | A | * | 7/1960 | Beck et al. .................. 366/314 |
| 3,739,711 | A | * | 6/1973 | Nieblach ..................... 99/348 |
| 4,576,483 | A | * | 3/1986 | Mathis et al. ................. 366/65 |
| 4,650,337 | A | * | 3/1987 | Otto ............................. 366/70 |

(Continued)

FOREIGN PATENT DOCUMENTS

| | | |
|---|---|---|
| DE | 19629945 | 1/1998 |
| DE | 10139413 | 3/2003 |
| EP | 1347093 | 9/2003 |

OTHER PUBLICATIONS

International Search Report, of FR 2006/00739, 3 pgs, Jul. 13, 2006.

*Primary Examiner*—Tony G Soohoo
(74) *Attorney, Agent, or Firm*—Cantor Colburn LLP

(57) ABSTRACT

The invention relates to a device for continuously mixing ingredients of a flour-and-water-based food dough comprising two mixing tools rotatably mounted one above the other about an axis of rotation, wherein the top tools is embodied in the form of a helix extending in a substantially perpendicular direction to said axis of rotation in such a way that the ingredient mixture is produced, the lower tool comprises at least one radial arm provided with a leading surface inclined with respect to the axis of rotation and an enclosure is provided with a mixed dough discharge opening which is arranged in the peripheral side part of a mixing space and in front of the lower tool.

17 Claims, 3 Drawing Sheets

U.S. PATENT DOCUMENTS

| | | | |
|---|---|---|---|
| 4,918,665 A * | 4/1990 | Herfeld | 366/294 |
| 5,471,917 A * | 12/1995 | Hsu | 366/293 |
| 6,312,246 B1 * | 11/2001 | Pozzobon | 366/314 |
| 2006/0126427 A1 * | 6/2006 | Fisson et al. | 366/76.6 |
| 2008/0305232 A1 * | 12/2008 | Fisson et al. | 366/290 |

* cited by examiner

DEVICE FOR CONTINUOUSLY MIXING A FOOD DOUGH PROVIDED WITH TWO TYPES OF SUPERIMPOSED MIXING TOOLS AND A SIDE DISCHARGE

CROSS-REFERENCE TO RELATED APPLICATIONS

This application is a continuation of International Application No. PCT/FR06/000739, filed Apr. 4, 2006, which claims priority from French Patent Application No. 05.03360, filed Apr. 5, 2005.

BACKGROUND

The present invention relates to a device for continuously mixing ingredients of a flour- and water-based dough, a method for manufacturing such dough providing the continuous mixing of ingredients using such a device as well as a facility for implementing such method.

The mixing device according to the invention is intended more particularly to mechanically mixing the dough prior to the kneading thereof. Such a device finds applications more particularly in facilities for manufacturing flour- and water-based dough in a continuous way, when the mixed dough is continuously or discontinuously kneaded, when the mixed dough is collected prior to being kneaded.

Mixing devices comprising a tank for mixing the various ingredients, more particularly water and flour, and a continuous unloading tank for unloading the mixed dough into a kneading vessel, are known. The mixing tank is provided with a mixing tool activated by first powered means. Besides, a continuous unloading tool extends between the mixing tank and the unloading tank so that the mixture formed in the mixing tank is continuously fed up to an outlet opening provided in the unloading tank. Such an unloading tool is activated by second powered means which are distinct from the first ones.

One problem entailed in this type of device is that its structure is complex because it requires using two distinct powered means and two distinct types of tools to respectively perform the mixing and the unloading operations. Using such two types of tools with their own powered means more particularly requires a particular and complex arrangement to avoid interactions between the tools and/or the means transmitting the rotation torques between the tool and the powered means. Besides, the maintenance and more particularly the cleaning procedures of the mixing device are not optimal.

Besides, because of this complex structure, such a device is very heavy and cumbersome which entails problems more particularly when integrating the device in a facility for manufacturing dough.

The invention aims at solving these problems by providing a mixing device structure making it possible to mix the ingredients and unload the mixed dough using the mixing tools only. Besides, the invention makes it possible to facilitate the production ends thanks to the small quantities being processed in the device, and through the automatic emptying upon completion of the production thanks to the stoppage of the supply at the inlet. Besides, the invention provides a mixing device which is easily cleaned, even when it is automatically operated, considering its structure.

SUMMARY OF THE INVENTION

For this purpose and according to a first aspect, the invention relates to a device for continuously mixing ingredients of a flour- and water-based dough, said device comprising an enclosure defining a mixing space having a circular cross-section, wherein at least two mixing tools are rotatively mounted one above the other around a rotation axis, powered means driving into rotation said tools, said enclosure comprising an upper inlet for supplying the space with ingredients which is substantially coaxial with the rotation axis, wherein the upper tool is composed of an impeller which substantially extends perpendicularly to the rotation axis so as to perform a pre-mixing of the ingredients, the lower tool comprising at least one radial arm having a leading surface inclined with respect to the rotation axis, the enclosure being provided with an outlet for unloading the mixed dough which is located in the side part of the periphery of the mixing space and opposite the lower tool.

Thus, by providing a centrifuge mixing of the dough which is combined with a side unloading, the device makes it possible for the mixing tools to perform both an optimal mixing and a unloading of the mixed dough. Besides, the presence of two types of superimposed mixing tools along the rotation axis makes it possible to optimize the quality of the mixing with respect to the mixing time and to the power consumed by the powered means.

According to a second aspect, the invention relates to a method for manufacturing a flour- and water-based dough, said method providing the continuous mixing of the ingredients of said dough using a mixing device according to the first aspect, and to knead said dough which is unloaded from the device.

According to a third aspect, the aim of the invention is to provide a facility for the implementation of such method, comprising a mixing device according to the first aspect and a kneading vessel wherein kneading tools are positioned, said vessel comprising an upstream port for supplying the mixture to be kneaded which is communicating with, or positioned opposite the unloading outlet, and a downstream outlet for the kneaded dough, said vessel being so arranged as to allow the displacement of the dough in the vessel from the upstream port to the downstream port, during the continuous supply of the vessel with the mixture unloaded from the mixing device.

Other objects and advantages of the invention will become evident when reading the following description, while referring to the appended drawings, wherein:

DETAILED DESCRIPTION

In the Figures, is shown a device for the continuous mixing of the ingredients of a flour- and water-based dough.

The words "flour- and water-based dough" can designate any mixture comprising water and flour in proportions suitable to the type of desired dough. The latter can be more or less fluid, more or less viscous. More particularly, the word dough can designate the liquid leaven.

The device more particularly makes it possible to mechanically mix the dough prior to its being kneaded. However, considering the quality of the mixing obtained with the device according to the invention, the mixed dough can be used without such subsequent kneading, in some applications.

Figure 1:
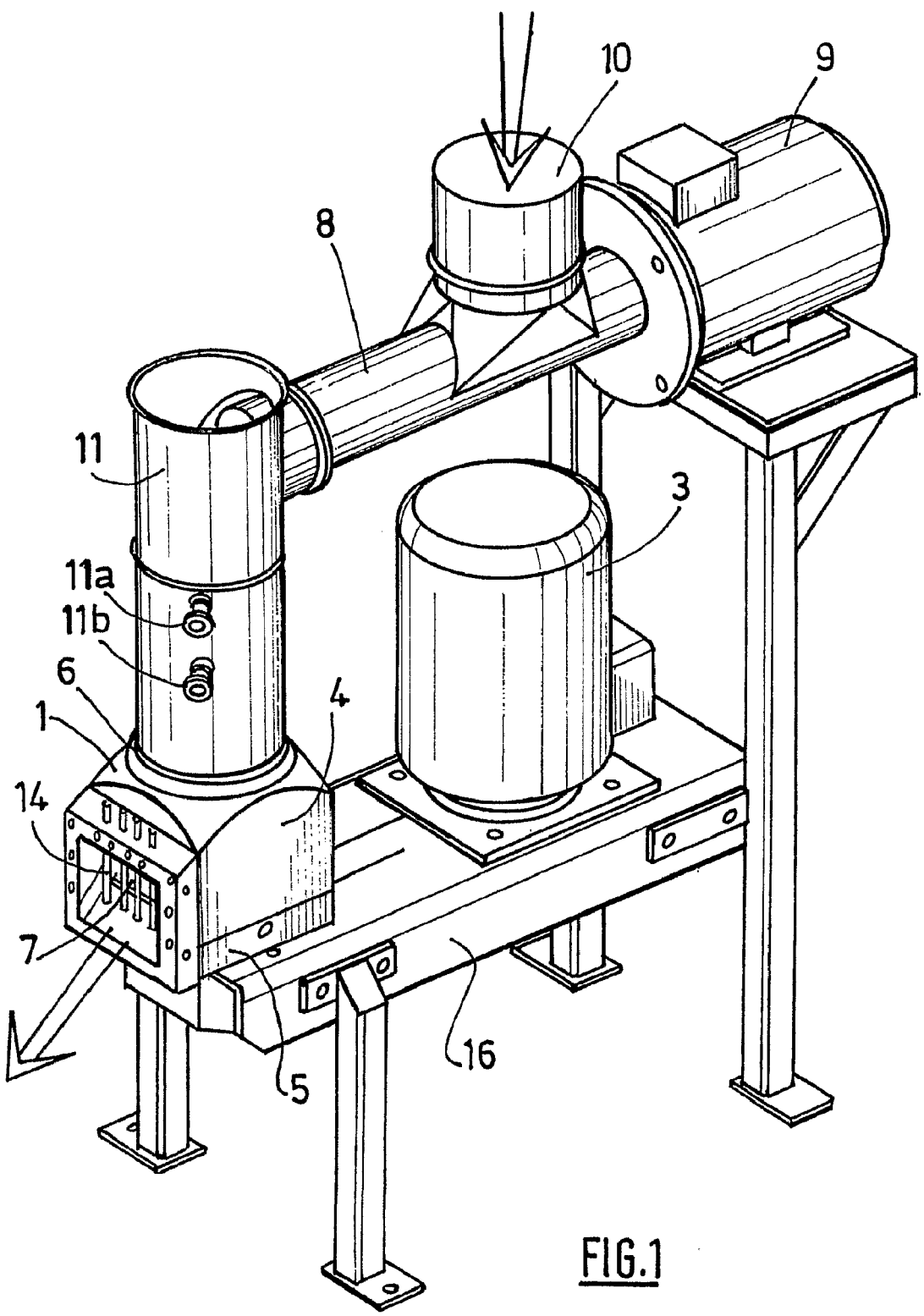
FIG. 1 is a perspective view of a mixing device according to a first embodiment.
Figure 2:
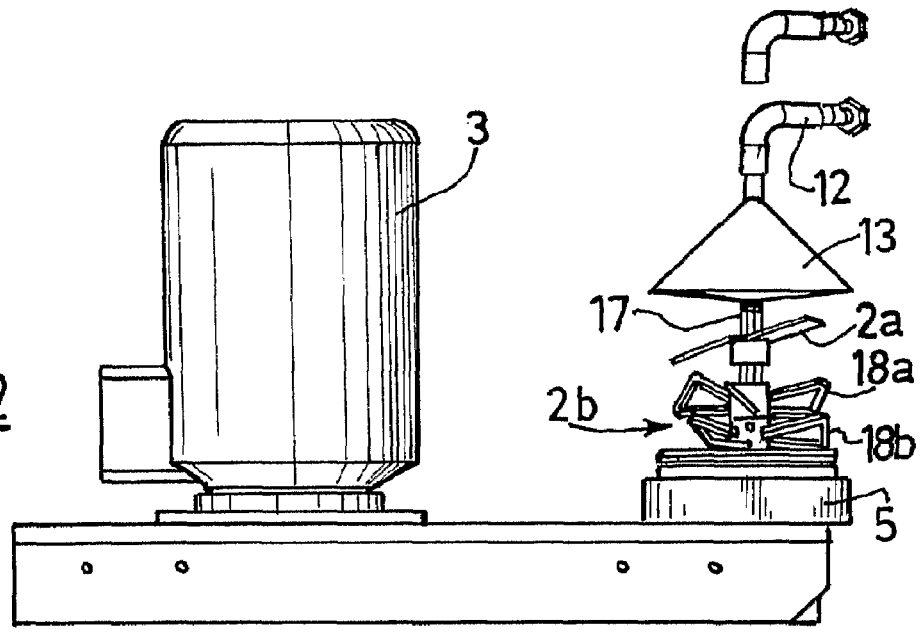
FIG. 2 is a partial view of the side of the mixing device of FIG. 1 in which the sleeve and the bell are not shown, so that the water supply full cone and the position of the mixing tools can be seen.
Figure 3A:
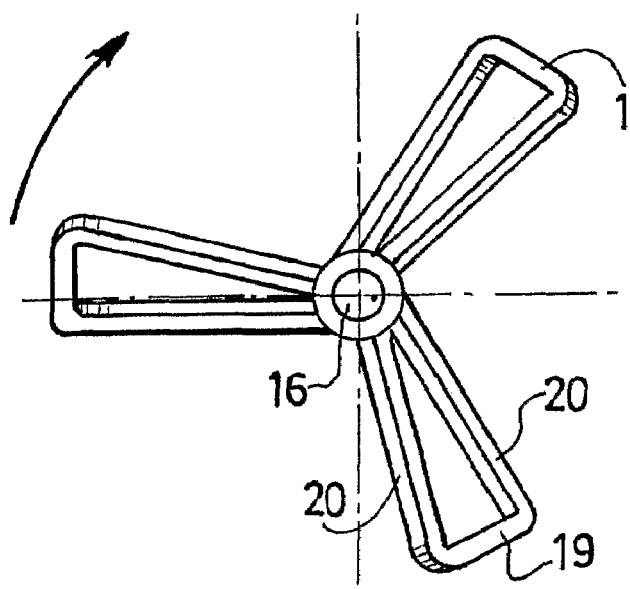
FIG. 3 show the upper and lower arms of the lower mixing tool shown in FIG. 1.

The device comprises a mixing enclosure 1 inside of which two mixing tools 2 are rotatively mounted one above the other around a rotation axis A. The device also comprises powered means 3 to drive the tools 2 in rotation according to a mixing direction which is shown in FIG. 3a by a clockwise-oriented arrow.

In the remainder of the description, the words "axial" or "longitudinal" and "radial" or "transversal" refer to planes which are respectively parallel or perpendicular to axis A.

The mixing enclosure 1 defined in a mixing space having a circular cross-section along axis A. The enclosure 1 comprises a bell 4 which is tightly associated with a support 5 having a general plane form so as to define the mixing space in which the mixing tools 2 are arranged.

The enclosure 1 can incorporate devices used for preparing a flour- and water-based dough. Such devices make it possible for example to control the conditions under which the ingredients are mixed. This can more particularly concern a cooling device. The enclosure 1 then comprises chamber for the circulation of a cooling fluid such as glycol between an upstream port and a downstream port provided on the periphery of the bell 4.

As a possibly complementary alternative solution, the enclosure 1 can incorporate a heating device and comprise several circulation chambers between the upstream port and the downstream port.

The ingredients introduced into the mixing space are mixed by the mixing tools 2 between an inlet for supplying 6 the space with the ingredients which is provided in the enclosure 1 in a substantially coaxial way with respect to the rotation axis A and an outlet for unloading 7 the mixed dough.

The mixing device comprise an upper tool 2a which is composed of an impeller which extends substantially perpendicularly to the rotation axis A so as to perform a pre-mixing of the ingredients.

The mixing device also comprises a lower tool 2b comprises at least one radial arm 18 having a leading surface inclined with respect to the rotation axis A, the enclosure 1 being provided with the mixed base unloading outlet 7 which is located in the side part of the periphery of the mixing space and opposite the lower tool 2b.

The impeller 2a shown comprises two solid blades mounted on a hub so as to perform a pre-mixing prior to the coming into contact of the ingredients with the lower tool 2b, by stopping the supply with ingredients when they fall through the supply inlet 6.

In the embodiment shown, the lower tool 2b comprises upper arms 18a and lower arms 18b which are spaced along the rotation axis A. More particularly, the lower tool 2b comprises two hubs 16 for an association with the driving shaft 17 and three arms 18 which radially extend from each hub 16. Each arm 18 is inclined with respect to the frontwards rotation direction of the lower tool 2b, so as to have a leading surface the normal of which is oriented towards the bottom of the mixing space.

The three arms 18 are identical and equally distributed around the hub 16 with an angular deviation during the rotation which is equal to 120°. This positioning has the advantage of giving a better stability when the lower tool 2b is rotating.

Figure 3B:
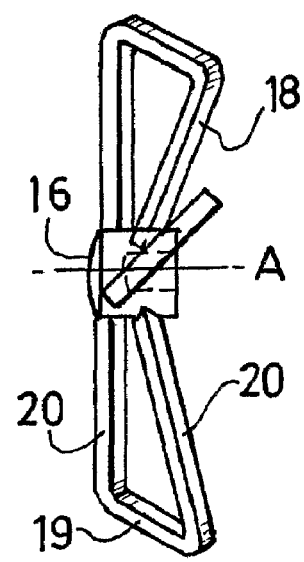
Figure 3C:
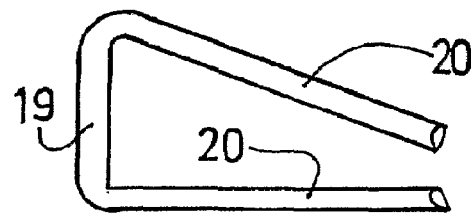

Each arm 18 comprises a U-shaped tube having a polygonal cross-section, more particularly a square or triangular or circular cross-section (FIG. 3c). The basis 19 of the U is so arranged that the branches 20 are positioned one above the other and form the leading surface into the dough. Both branches 20 of the U are associated with the hub 16 so that the upper branch 20 is positioned in front of the lower branch 20 with respect to the rotation direction (FIG. 3b). For example, the angle between the normal of the leading surface and the rotation axis A is of the order of 45°.

Besides, the length of each arm 18 is similar to that of the impeller blades 2a and can be relatively limited because of the presence of the upper 18a and lower 18b arms. The lower tool 2b is positioned opposite and away from the upper surface of the support 5 so that the distance between the lower end of the arm 18 and the support 9 is small.

Thus, in this particular embodiment, the work on the dough is a combination of shearing, rolling on the edge of the mixing space, pressing on the upper surface of the support 5 and centrifuging during the rotation of the tool 2.

However, the selection of the number and of the form of the arms 18, and of the inclination of the leading surface makes it possible to adapt the device to the type of the desired mixed dough.

To rotate the mixing tool 2, the powered means 3 may comprise one motor or several motors which drive into rotation the motor shaft 17 which the mixing tools 2 are associated with. Besides, the powered means 3 can be provided with regulators making it possible to adapt the rotation speed for example to the type of the mixture or to the desired outflow rate. In a particular example, the powered means 3 comprise a 3 KW motor. The duration of the mixing of the dough in closed circuit by tool 2 is then comprised between one and five seconds, depending on the unloading flow rate of the mixed dough and its hygrometry.

Because of the combined utilization of the two types of tools positioned according to the invention, the work on the dough makes it possible to obtain a mixing of good quality (thick dough, good homogenization) by performing a first kneading of the mixed dough prior to its being introduced into the kneading vessel and this for a very short mixing time and a low consumption of power (typically 10 KW are required for the mixing devices according to the prior art).

Upstream from the mixing device, the ingredients to be mixed to obtain the type of dough required are introduced according to the required proportions, for example by weight for solid ingredients (more particularly in the form of a powder) and by volume for the liquid ingredients, prior to their introduction into the mixing space. These ingredients more particularly comprise flour, water and other elements used in a bakery, for example oil, leaven and improvers such as ascorbic acid. Other types of solid ingredients which do not directly belong to the composition of the dough proper can also be mixed such as chocolate (molten or in chips), dried fruit, etc.

The continuous feeding of the mixing device with the ingredients is performed by continuous feed or supply means. As shown, the solid ingredients feed means can be in the form of a duct 8 having a substantially circular cross-section and made of a flexible or rigid material or a combination of both, in which a screw operated by a motor 9 brings the solid ingredients from an introduction port 10 to the supply inlet 6.

In the embodiment shown, the supply inlet 6 is covered with a sleeve 11 which communicates with the duct 8 so that the solid and liquid ingredients are introduced by gravitation into the mixing space through said supply inlet. The sleeve 11 is coaxial with the rotation axis A, substantially cylindrical and has a radius substantially equal to that of the supply inlet 6 and to that of the circular cross-section of the mixing space.

Besides, the periphery of the sleeve 11 comprises two inlets 11a, 11b for the supply with liquid ingredients respectively a lower inlet for the supply with water and an upper inlet for the supply with liquid improvers, the supply with solid ingredients being performed at the upper part on the sleeve 11. According to other embodiments, one or more than two liquid supply inlets can be provided on the sleeve or directly on the enclosure 1.

To perform a satisfactory and homogeneous wetting of all the solid ingredients present in the sleeve 11 and then in the mixing space, at least the water supply inlet 11b is provided with a nozzle 12 arranged so as to make it possible to introduce liquid along a substantially solid cone 13. The liquids are injected in the form of fine low pressure droplets so as to form a mist making it possible to wet the solid ingredients almost instantaneously. More particularly, the nozzle 12 comprises a duct forming an elbow in the vicinity of the center of the sleeve 11, said elbow being oriented downwards so that the cone 12 is coaxial with the rotation axis A and oriented downwards. According to the embodiment shown, the geometry of the solid cone 12, of the sleeve 11 and of the supply inlet 6 are adapted to the diameter of the mixing space so as to homogeneously wet the ingredients falling by gravitation, said ingredients then falling on the whole extent of the tools 2 to be pre-mixed by the impeller 2a and mixed by the lower tool 2b.

The unloading of the mixed dough is performed by the unloading outlet 7 on the one hand because of the centrifuge effect resulting from the rotation of the tools 2 and on the other hand by shearing against the edges of the mixing space. The unloading outlet 7 has an axis perpendicular to the rotation axis so as to perform a radial unloading of the mixed dough.

According to the embodiment shown, the unloading outlet 7 is provided with a harrow 14 for the regulation of the flow rate of the mixed dough. More particularly, this embodiment makes it possible to control the time during which the dough stays in the mixing space.

In order to facilitate the maintenance and the cleaning of the enclosure 1 or to control the supply with ingredients or the unloading of the mixed dough, the supply inlets 6 and/or unloading inlet 7 can be provided with insulation valves (not shown) and more particularly with a sleeve coupling valve for the supply inlet 6 and a slide gate valve for the unloading outlet 7.

The mixing device as described above may equally be used in a facility manufacturing a flour- and water-based dough in a continuous or discontinuous manner.

In a facility in which the flour- and water-based dough is discontinuously manufactured, a method is implemented in which the ingredients of the dough are continuously mixed in the mixing device, the mixed dough being unloaded from the device is then collected prior to being kneaded in a kneading vessel.

In a facility in which the flour- and water-based dough is continuously manufactured, a method is implemented in which the ingredients of the dough are continuously mixed in the mixing device, the mixed dough unloaded from the device being continuously kneaded in a kneading vessel.

Figure 4:
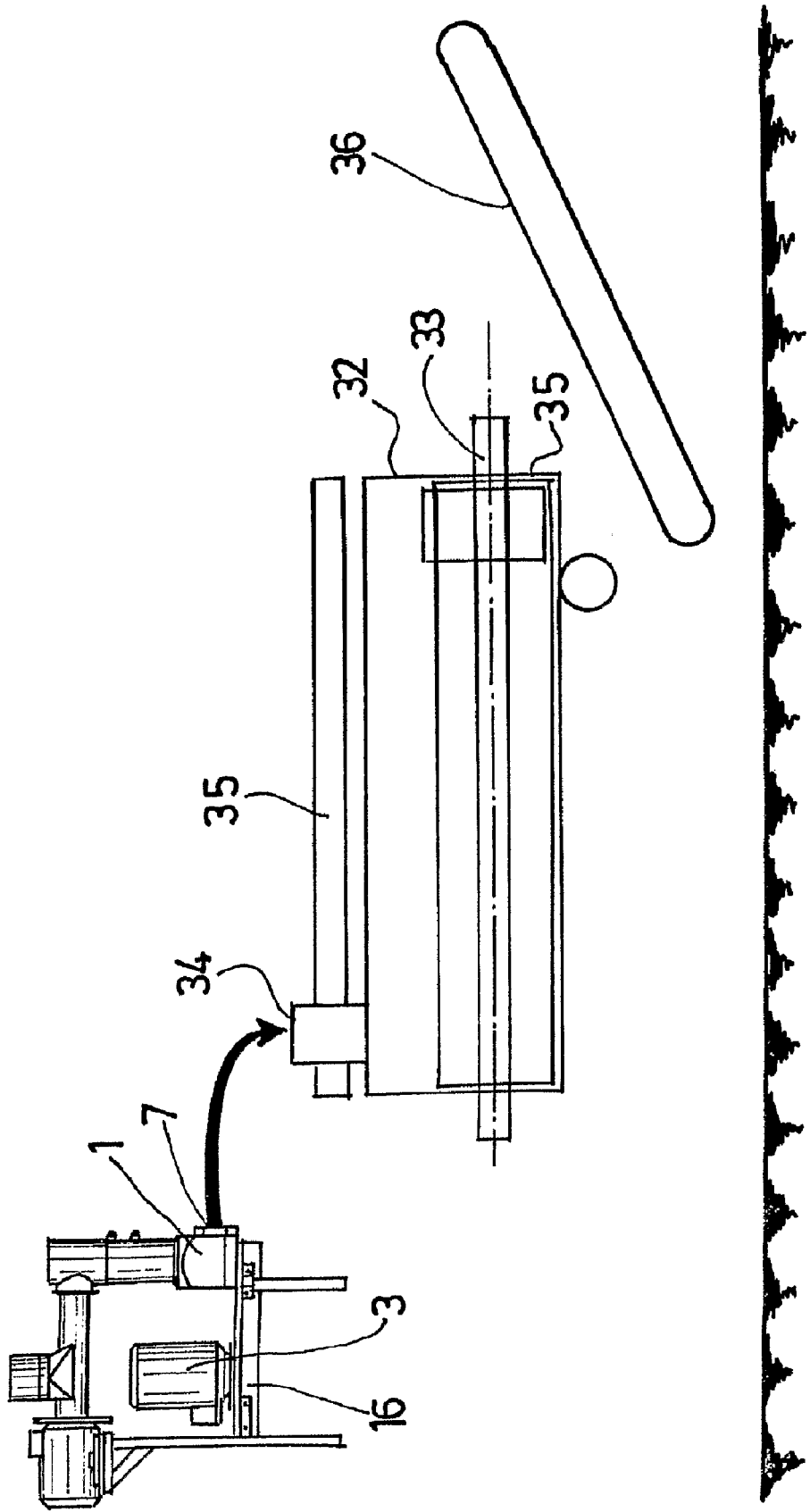
FIG. 4 is a schematic diagram of a facility for the continuous manufacturing of a flour- and water-based dough comprising a mixing device according to FIG. 1.

For this purpose, the latter facility shown in FIG. 4, comprises the mixing device and a kneading vessel 32 wherein the kneading tools 33 are positioned in the vicinity of the vessel bottom. The mixing device is mounted on a frame 16 as well as the kneading vessel 32 (not shown).

The vessel 32 comprises a first and a second substantially vertical side walls connected through the vessel bottom. The opening of the vessel 32 can be covered with a lid 35 removably mounted on the vessel 32. The vessel 32 comprises, on its upper part, an upstream port 34 for supplying the mixed dough to be kneaded. The upstream port 34 communicates with the unloading outlet 7 of the mixing device for example using second supply means which can be in the form of ducts having a substantially circular or rectangular cross-section and made of a flexible or rigid material or a combination of both. The upstream inlet 34 of the vessel 32 can also be positioned opposite the unloading outlet 7.

The vessel 32 is arranged so as to allow the displacement of the mixed dough in the vessel 32 from the upstream port 34 and a downstream port 35 for unloading the kneaded dough, during the continuous supply of the vessel 32 with the mixed dough from the mixing device. The downstream port 35 is located on a side face of the vessel 32 and positioned at a predetermined distance from a device 36 for collecting the kneaded dough unloaded from the vessel 32, such as an endless screw.

What is claimed is:

1. A device for continuously mixing the ingredients of a flour- and water-based dough, said device comprising an enclosure defining a mixing space having a circular cross-section in which at least two mixing tools are rotatively mounted one above the other around a rotation axis (A), powered means driving into rotation said tools, said enclosure comprising an upper inlet for supplying the space with ingredients which is substantially coaxial with the rotation axis, said device being wherein the upper tool is composed of an impeller extending substantially perpendicularly to the axis of rotation so as to perform a pre-mixing of the ingredients, the lower tool comprising at least one radial arm having a leading surface which is inclined with respect to the rotation axis, the enclosure being provided with a mixed dough unloading outlet which is located in the side part of the periphery of the mixing space and opposite the lower tool.

2. The mixing device of claim 1, wherein the supply inlet is covered with a sleeve in which the solid and liquids ingredients are introduced to fall by gravitation into the mixing space, through said supply inlet.

3. The mixing device of claim 2, wherein the sleeve is coaxial with the rotation axis.

4. The mixing device of claim 3, wherein the sleeve is substantially cylindrical, having a radius substantially equal to that of the supply inlet and to that of the circular cross-section of the mixing space.

5. The mixing device of claim 2, wherein the periphery of the sleeve comprises at least one supply inlet for liquid ingredients, the supply with solid ingredients being carried out at the upper part of the sleeve.

6. The mixing device of claim 5, wherein the supply inlet for liquid is provided with a nozzle which is arranged so as to allow the introduction of liquid into the mixing space, along a substantially solid cone.

7. The mixing device of claim 6, wherein the nozzle is positioned in the sleeve so that the cone is coaxial with the rotation axis and oriented downwards.

8. The mixing device of claim 1, wherein the unloading outlet is provided with a harrow for regulating the flow rate of the mixed dough.

9. The mixing device according to claim 1, wherein said unloading outlet has an axis perpendicular to the rotation axis, so as to perform a radial unloading of the mixed dough.

10. The mixing device of claim 1, wherein the enclosure comprises a bell which is tightly associated with a support, the unloading outlet being provided in the side wall of the bell.

11. The mixing device of claim 10, wherein the support has an upper surface which is substantially plane, and the lower tool is positioned from the upper surface of the support so that a distance between a lower end of the arm and the support is small.

12. The mixing device according to any one of claim 1, wherein the arms are inclined with respect to the direction of rotation of the lower tool, frontwards, so as to have a leading surface the normal of which is oriented towards the bottom of the mixing space.

13. The mixing device of claim 12, wherein the angle between the normal of the leading surface and the rotation axis is of the order of 45 degrees.

14. The mixing device of claim 1, wherein the lower tool includes upper arms and lower arms which are spaced along the rotation axis.

15. The mixing device of claim 14, wherein the lower tool comprises two hubs for an association with the motor, which are coaxially superimposed, three identical arms which extend radially from each hub, the arms being equally distributed around the hub with an angular deviation equal to 120 degree.

16. The mixing device of claim 15, wherein each arm comprises a U-shaped tube, both branches of the U being associated with the hub (16) so that the upper branch of the U is positioned with respect to the rotation direction of the lower tool, in front of the lower branch of the U, the leading surface into the dough being formed between said branches.

17. The mixing device according to claim 1, wherein the enclosure comprises at least one fluid circulation tank between an upstream port and a downstream port provided on the external wall of said enclosure.

* * * * *